April 15, 1924.

E. W. KNOWLTON

MEAT CUTTING MACHINE

Filed Dec. 11, 1923      3 Sheets-Sheet 1

1,490,747

Inventor,
Eugene W. Knowlton,
by Geyer & Geyer
Attorneys.

April 15, 1924. 1,490,747
E. W. KNOWLTON
MEAT CUTTING MACHINE
Filed Dec. 11, 1923 3 Sheets-Sheet 2

Inventor,
Eugene W. Knowlton,
by Geyer & Geyer
Attorneys.

April 15, 1924.
E. W. KNOWLTON
MEAT CUTTING MACHINE
1,490,747
Filed Dec. 11, 1923   3 Sheets-Sheet 3
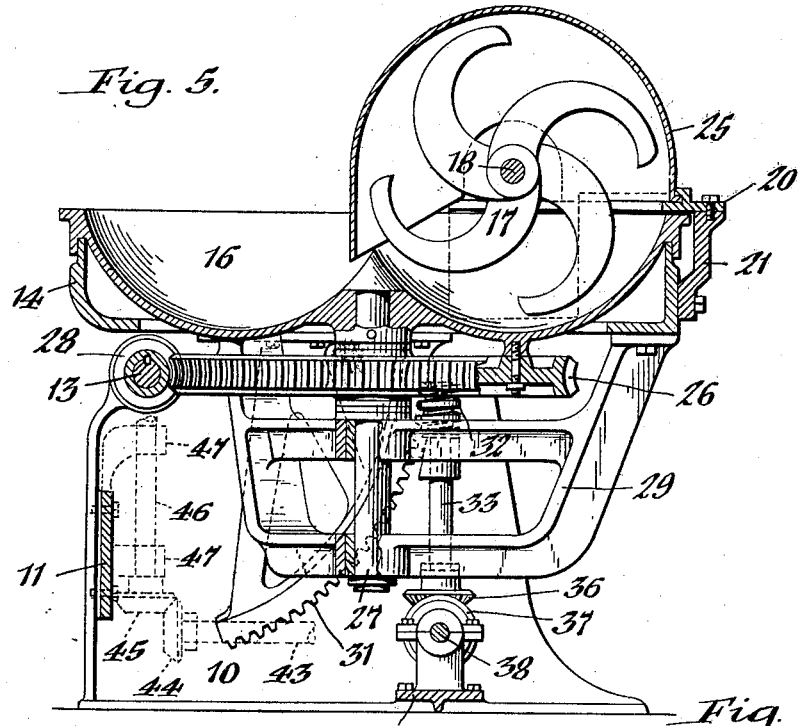
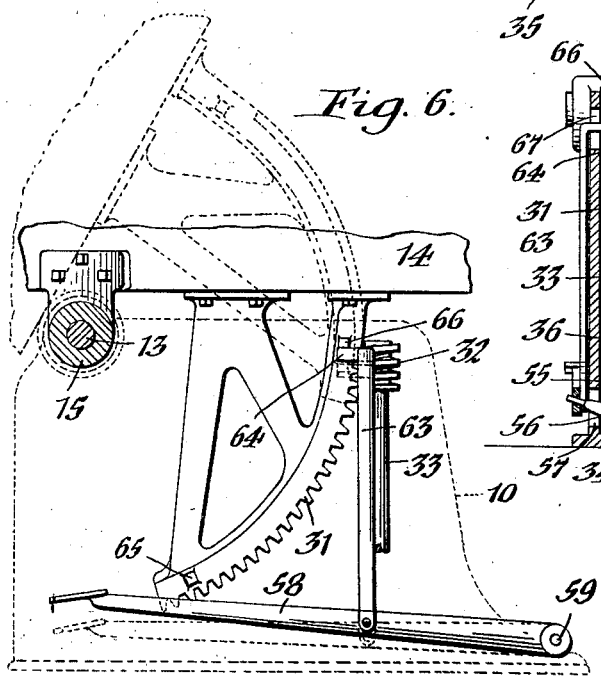
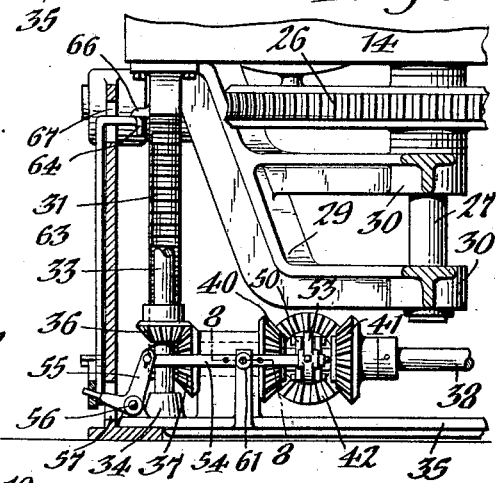
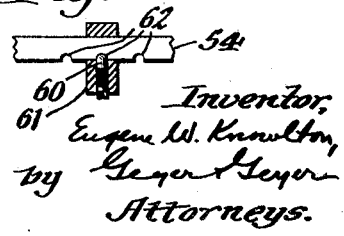

Patented Apr. 15, 1924.

1,490,747

UNITED STATES PATENT OFFICE.

EUGENE W. KNOWLTON, OF BUFFALO, NEW YORK, ASSIGNOR TO JOHN E. SMITH'S SONS COMPANY, OF BUFFALO, NEW YORK, A CORPORATION OF NEW YORK.

MEAT-CUTTING MACHINE.

Application filed December 11, 1923. Serial No. 679,985.

*To all whom it may concern:*

Be it known that I, EUGENE W. KNOWLTON, a citizen of the United States, residing at Buffalo, in the county of Erie and State of New York, have invented new and useful Improvements in Meat-Cutting Machines, of which the following is a specification.

This invention relates to a meat cutting machine of the type employed by packers for cutting sausage meat.

Its chief object is to provide a sanitary machine of this character in which the meat bowl can be tilted or elevated for the purpose of dumping its contents without handling the same.

Another object of the invention is to provide the machine with power-driven means for effecting the raising and lowering of the meat bowl without interfering with the usual drive mechanism of the machine.

A further object is the provision of efficient and reliable means for automatically arresting the meat bowl when it reaches its tilted or dumping position and its normal operative position.

A still further object of the invention is to provide a simple, strong and durable machine of this character which is not liable to get out of order, and whose parts are easily accessible for lubricating or adjusting purposes.

Figure 1:
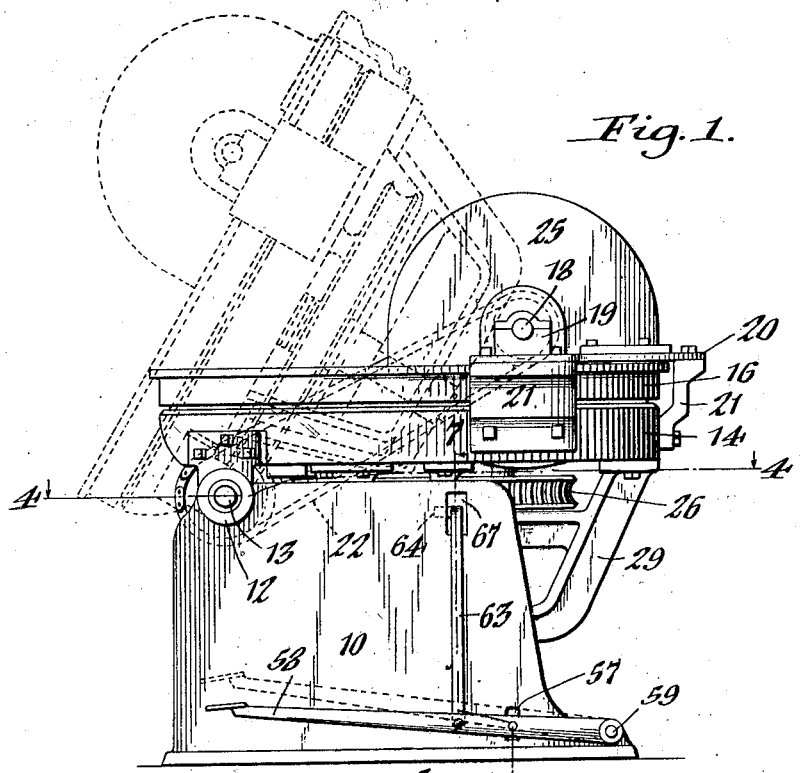
Figure 2:
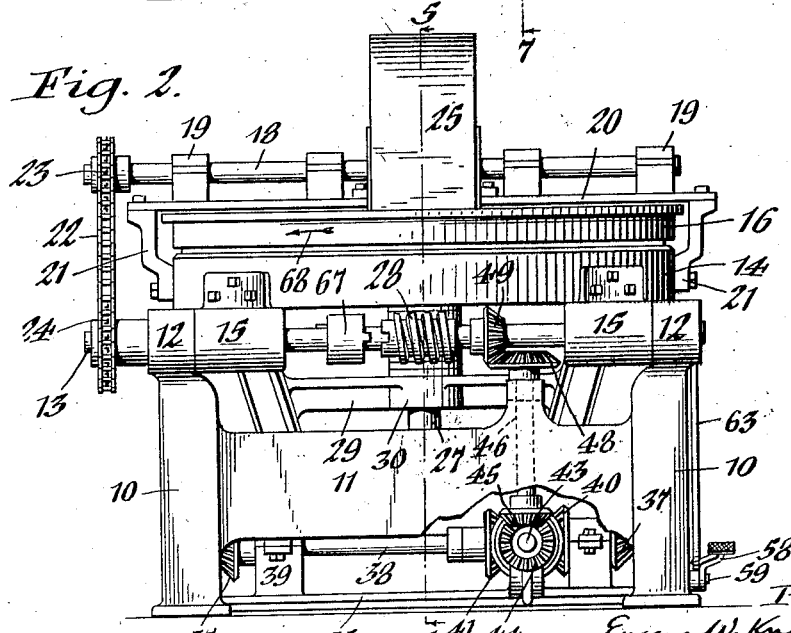
Figure 3:
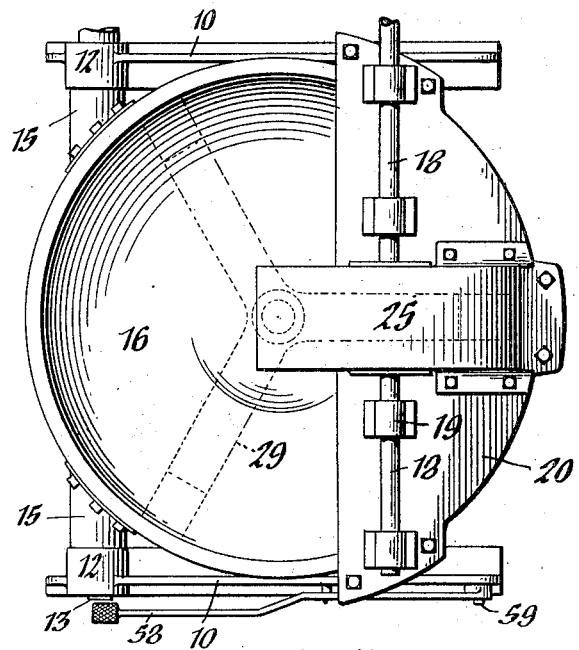
Figure 4:
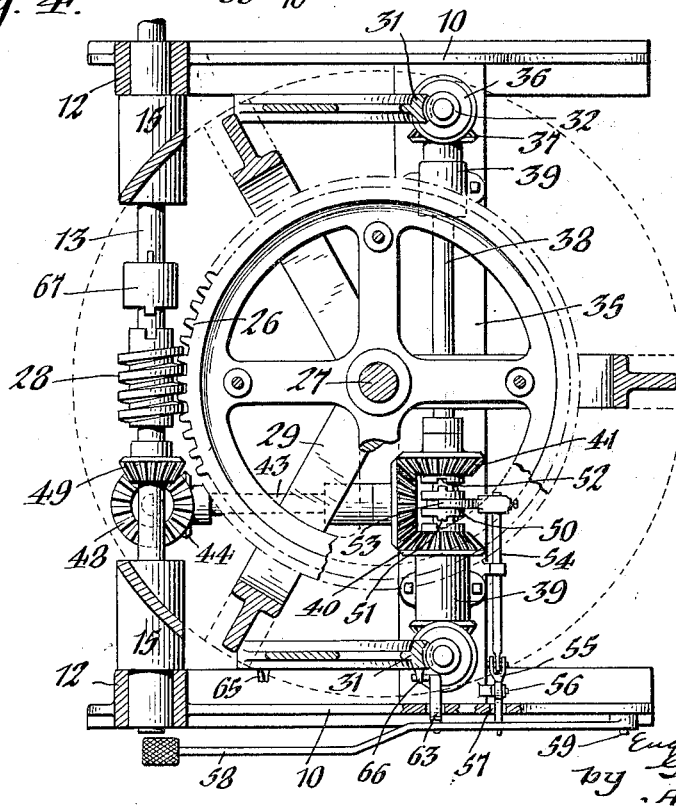

In the accompanying drawings: Figure 1 is a side elevation of a meat cutting machine embodying the invention. Figure 2 is a front view thereof. Figure 3 is a top plan view of the same. Figure 4 is an enlarged horizontal section on line 4—4, Fig. 1. Figure 5 is an enlarged vertical section on line 5—5, Fig. 2. Figure 6 is an enlarged sectional side elevation of the bowl-tilting and control mechanism. Figure 7 is an enlarged transverse vertical section on line 7—7, Fig. 1. Figure 8 is an enlarged fragmentary horizontal section on line 8—8, Fig. 7.

Similar characters of reference indicate corresponding parts throughout the several views.

In its general organization, this improved machine comprises a supporting frame upon which its working parts are mounted, a circular support or bed-ring hingedly mounted on said frame, a rotary bowl arranged within the bed-ring and containing rotary cutters, power-actuated means for tilting said bed-ring, and means for automatically arresting the latter when it reaches the end of its predetermined travel in either direction.

The supporting frame preferably comprises a pair of upright standards 10 joined at their front ends by a transverse tie-plate 11. Journaled in bearings 12 formed in the upper front ends of these standards is a horizontal driving shaft 13 driven by an electric motor or other source of power (not shown).

The numeral 14 indicates the circular support or bed-ring which is tiltable in a vertical plane and for this purpose is provided near its periphery and at the opposite sides of its front end with depending hinge-brackets or fulcrum collars 15 freely mounted on the shaft 13 to rock relatively thereto. The bowl 16, which is of the usual concavo-convex form, is rotatably arranged within the bed-ring, and the customary rotary cutter 17 is mounted on a transverse shaft 18 journaled in bearings 19 carried by a coverplate 20 arranged over the rear portion of said bowl and supported by suitable brackets 21 secured to the bed-ring. As shown in the drawings, the cutter shaft may be driven from the driving shaft 13 by a sprocket-chain 22 passing around sprockets 23, 24, mounted on the respective shafts. A hood 25 may be provided for enclosing the cutter, if desired.

Any suitable means may be employed for rotating the bowl 16, that shown in the drawings being preferable, and consisting of a worm-wheel 26 mounted on a vertical shaft 27 depending from said bowl and attached to the underside thereof by bolts or other fastenings, the same meshing with a worm 28 mounted on the driving shaft 13 of the machine. The lower end of the worm-wheel shaft is journaled in a skeleton-like frame or spider 29 secured to the underside of the bed-ring 14, and having upper and lower bearings 30, as shown in Figs. 5 and 7.

The power-actuated means for raising and lowering the bed-ring and its bowl from the position shown by full lines in Fig. 1 to the dotted line position shown in the same figure, and vice versa, is preferably constructed as follows:

Depending from the bed-ring and located on opposite sides thereof are vertically-disposed gear segments 31 which constantly mesh with corresponding worms 32 secured to the upper ends of upright shafts 33 journaled in step bearings 34 formed in a transverse base plate 35 fastened at its opposite ends to the standards 10 of the machine-frame. At their lower ends said worm shafts 33 are provided with bevel gears 36 which mesh constantly with similar gears 37 fixed on the ends of a horizontal shaft 38 journaled in suitable bearings 39 on the base plate 35. Said shaft 38 is adapted to be driven in either direction to effect the raising or lowering of the bowl 16 and for this purpose has fixed thereon, intermediate its ends, opposing bevel gears 40, 41 which mesh with the opposite sides of a bevel gear 42 fixed on one end of a horizontal shaft 43 arranged lengthwise of the machine. At its other end, this shaft has fixed thereon a bevel gear 44 which engages a similar gear 45 mounted on the lower end of an upright shaft 46 journaled in bearings 47 formed on the transverse plate 11 of the machine-frame. The upright shaft 46 is driven from the main driving shaft 13 through the medium of bevel gears 48, 49 or similar gearing, such for example, as a worm and a worm wheel.

In order to control the direction of movement of the bowl-elevating shaft 38 and also to arrest the tilting movement of the bowl at will or automatically when it reaches the end of its predetermined travel in either direction, a suitable clutch mechanism is provided. In the preferred embodiment shown in Figs. 4, 6 and 7 of the drawings, the same comprises a clutch collar 50 shiftable lengthwise of the shaft and interposed between the opposing gears 40, 41 to assume a neutral position or one engaged with either of said gears. For this purpose, the clutch collar is provided at its ends with teeth 51 and the opposing faces of the companion gears have corresponding radial notches 52. A fork 53 co-operates with the clutch collar and is connected to the inner end of a horizontal shifting bar or member 54 suitably guided on the base plate 35. At its outer end this shifting bar is pivoted to one arm of a bell-crank lever 55 fulcrumed at 56 to said base plate or other adjacent part, the other arm of the bell-crank projecting outwardly through an opening 57 in the adjacent frame-standard 10 and connected to a vertically-swinging foot lever 58 fulcrumed at 59 to the rear end of such standard. Upon depressing or raising the foot lever from its neutral position, the clutch collar 50 is shifted into engagement with either of the gears 40, 41 to cause the bowl 16 to be elevated to the inclined position shown by dotted lines in Fig. 1 or to be lowered to the substantially horizontal position shown by full lines in the same figure.

For the purpose of positively retaining the clutch-control parts in a set position, a suitable locking mechanism is employed. As shown in Figs. 7 and 8, this mechanism consists of a spring-pressed locking catch or plunger 60 mounted in a suitable bracket 61 projecting upwardly from the base plate 35 and adapted to interlock with one or another of three recesses or depressions 62 formed in the opposing side of the shifting bars 54. Thus, when the foot lever 58 is raised or lowered out of its neutral position to effect the vertically-swinging movement of the bowl in one direction or the other, the shifting bar is likewise moved in a corresponding direction and the spring catch is allowed to interlock with either one of the end recesses of said bar to reliably hold the same in position during the movement of the bowl.

To automatically stop the raising or lowering movement of the bowl when it reaches its highest or lowest position, a substantially vertical tappet arm 63 is provided which is preferably carried by the foot lever and which has a contact finger 64 arranged in the path of trip lugs or projecting cams 65, 66 formed on the adjacent gear segment 31. As shown in Figs. 1 and 7, said contact finger projects through an opening 67 in the adjacent standard 10. Upon either one of the trip lugs striking this tappet arm, the latter is accordingly forced up or down, moving the foot lever with it to its neutral position and simultaneously forcing the shifting bar 54 in the proper direction to disengage the clutch, thereby instantly stopping the bowl in either the full line or dotted line position thereof shown in Fig. 1.

As shown in Figs. 2 and 4, the bowl-driving worm 28 is preferably loosely mounted on the driving shaft 13 to slide lengthwise thereof, the same being adapted for engagement with a clutch-collar 67 fixed on said shaft. When it is desired to rotate the bowl, the same is turned in a clockwise direction, as indicated by the arrow 68, sufficiently to move the worm into engagement with its clutch-collar, the worm wheel 26 thereafter holding said worm in its operative position.

By this construction and arrangement of the driving and control mechanism, the bowl 16 can be rotated in both its tilted and lowered positions or it can be thrown out of gear when desired for cleaning or adjusting purposes.

The operation of this machine is as follows:

Assume the parts to be in their neutral or inoperative positions and the driving shaft 13 to be in motion, the rotation of the bowl 16 having been stopped for the purpose of discharging its contents. The bed-ring 14 together with its bowl is now tilted to the dotted line position shown in Fig. 1, which movement is effected by depressing the foot lever 58 to the position shown by dotted lines in Fig. 6. This movement of the foot lever forces the shifting bar 54 outwardly to bring the clutch 50 into engagement with its companion gear 40, thereby transmitting motion to the gear segments 31 to elevate the meat bowl. Simultaneously with this shifting of the clutch to its engaged position, the tappet arm 63 is lowered from its full line position to the dotted line position shown in Fig. 6. When the bowl reaches its tilted position, the trip-lug 65 strikes the lower edge of the finger 64 of the tappet and raises the latter to its normal neutral position, which movement causes the foot lever to return to its initial position and the clutch to be disengaged, thereby arresting the further movement of the bowl and permitting its contents to be emptied. The lowering of the bowl is effected by raising the foot lever to the dotted line position shown in Fig. 1, which movement shifts the clutch collar 50 into engagement with its companion gear 41 and moves the tappet upwardly, as shown by dotted lines in the same figure. When the bowl reaches its substantially horizontal or lowered position, the trip lug 66 strikes the bottom edge of the tappet arm, forcing the same downwardly to return the foot lever to its initial position and simultaneously releasing the clutch, thereby stopping the bowl.

This improved sanitary meat-cutting machine is easy to operate and very efficient in operation; it affords a material saving in time in emptying the bowl of its contents without handling the same; and its parts are so organized and arranged that they are accessible for adjustment and other purposes.

I claim as my invention:

1. In a meat-cutting machine, the combination of a frame, a rotary bowl including a cutter, and a support for said bowl hinged to said frame.

2. In a meat-cutting machine, the combination of a frame, a rotary bowl including a cutter, a vertically-swinging support for said bowl hinged to said frame, and means for tilting said bowl-support.

3. In a meat-cutting machine, the combination of a frame, a rotary bowl including a cutter, a circular support for said bowl hinged near its periphery to said frame, and means for rotating said bowl and actuating said bowl-support either simultaneously or independently of each other.

4. In a meat-cutting machine, the combination of a frame, a rotary bowl including a cutter, a support for said bowl hinged to said frame, means for rotating said bowl, and means driven by said bowl-rotating means for raising and lowering the bowl-support.

5. In a meat-cutting machine, the combination of a frame, a rotary bowl including a cutter, a driving shaft geared to said bowl, a support for the bowl hinged at one side to said driving shaft, and means operatively connected to said driving shaft for raising and lowering said bowl-support about the axis of said driving shaft.

6. In a meat-cutting machine, the combination of a frame, a rotary bowl including a cutter, a driving shaft journaled in said frame and geared to said bowl, a support for the bowl hinged to said driving shaft, means driven from said shaft for raising and lowering said bowl-support, and means for controlling said bowl-support driving means.

7. In a meat-cutting machine, the combination of a frame, a rotary bowl including a cutter, a driving shaft journaled in said frame and geared to said bowl, a support for the bowl hinged to said driving shaft, and gearing connecting the driving shaft with said bowl-support for raising and lowering the latter about the axis of said shaft.

8. In a meat-cutting machine, the combination of a frame, a rotary bowl including a cutter, a driving shaft journaled in said frame and geared to said bowl, a support for the bowl hinged to said driving shaft, gear-segments carried by said bowl-support, gearing interposed between said gear-segments and said driving shaft, and means for controlling the movement of said bowl support.

9. In a meat-cutting machine, the combination of a frame, a rotary bowl including a cutter, a vertically-swinging support for said bowl hinged to said frame, means for raising and lowering said bowl-support, and means for automatically arresting the bowl-support when it reaches a predetermined position when traveling in either direction.

10. In a meat-cutting machine, the combination of a frame, a rotary bowl including a cutter, a vertically swinging support for said bowl hinged to said frame, power-driven means including a clutch for raising and lowering said bowl-support, and means controlled by the latter for releasing said clutch when the bowl-support reaches its highest or lowest position.

11. In a meat-cutting machine, the combination of a frame, a rotary bowl including a cutter, a vertical-swinging support for said bowl hinged to said frame, power-driven means including a clutch for raising and lowering said bowl-support, means for actuating said clutch including an operating lever and a tappet arm connected therewith, and means carried by said bowl-support and arranged to engage said tappet arm when the bowl-support reaches a predetermined point of its movement in either direction.

12. In a meat-cutting machine, the combination of a frame, a rotary bowl including a cutter, a vertically-swinging support for said bowl hinged to said frame, power-driven means including a clutch for raising and lowering said bowl-support, means for actuating said clutch, means for retaining said clutch-actuating means in different positions, and means controlled by said bowl-support for automatically releasing said clutch when the bowl-support reaches its highest or lowest position.

13. In a meat-cutting machine, the combination of a frame, a rotary bowl including a cutter, a vertically-swinging support for said bowl hinged to said frame, power-driven means including a clutch for raising and lowering said bowl-support, an operating lever for said clutch, means for retaining said lever in different positions, a tappet arm carried by said lever, and trip devices carried by said bowl-support and arranged to engage said tappet arm when the bowl-support reaches its highest or lowest position.

14. In a meat-cutting machine, the combination of a frame, a rotary bowl including a cutter, a vertically-swinging support for said bowl hinged to said frame, power-driven means including a clutch for raising and lowering said bowl-support, and means for actuating said clutch including an operating lever, a shiftable member connected at one end to said clutch, a bell crank having one of its arms connected to the other end of said shiftable member, the other arm of the bell crank being connected to said operating lever, a tappet arm carried by the latter, and trip devices carried by said bowl-support and arranged to engage said tappet arm when the bowl-support reaches its highest or lowest position.

15. In a meat-cutting machine, the combination of a frame, a rotary bowl including a cutter, a vertically-swinging support for said bowl hinged to said frame, power-driven means including a clutch for raising and lowering said bowl-support, and means for actuating said clutch including an operating lever, a shiftable member connected at one end to said clutch, means for retaining said shiftable member in different positions, a bell crank having one of its arms connected to the other end of the shiftable member, the other arm of the bell crank being connected to said operating lever, a tappet arm carried by the latter, and trip devices carried by said bowl-support and arranged to engage said tappet arm when the bowl-support reaches its highest or lowest postion.

EUGENE W. KNOWLTON.